J. G. HOLMES.
HOSE REEL.
APPLICATION FILED APR. 16, 1915.

1,202,718.

Patented Oct. 24, 1916.
2 SHEETS—SHEET 1.

Witnesses
Freds L. Fox.

Inventor
John G. Holmes.
By Victor J. Evans.
Attorney

J. G. HOLMES.
HOSE REEL.
APPLICATION FILED APR. 16, 1915.

1,202,718.

Patented Oct. 24, 1916.
2 SHEETS—SHEET 2.

Witnesses
Frederick L. Fox.

Inventor
John G. Holmes,
By Victor J. Evans
Attorney

UNITED STATES PATENT OFFICE.

JOHN G. HOLMES, OF KINGS MILLS, OHIO.

HOSE-REEL.

1,202,718. Specification of Letters Patent. Patented Oct. 24, 1916.

Application filed April 16, 1915. Serial No. 21,854.

*To all whom it may concern:*

Be it known that I, JOHN G. HOLMES, a citizen of the United States, residing at Kings Mills, in the county of Warren and State of Ohio, have invented new and useful Improvements in Hose-Reels, of which the following is a specification.

This invention relates to hose reels, and it has particular reference to a device embodying two lengths of hose wound about an axial member and connected together through said axial member so that the hose may be utilized by unwinding merely a sufficient portion thereof to irrigate a given area.

The invention has for its object to simplify and improve the construction of the reel or cart and of the tubular axial member whereby the hose lengths are connected together.

A further object of the invention is to simplify and improve the hose guiding means and also to provide spring means whereby the hose will be automatically rewound after use.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

Figure 1:
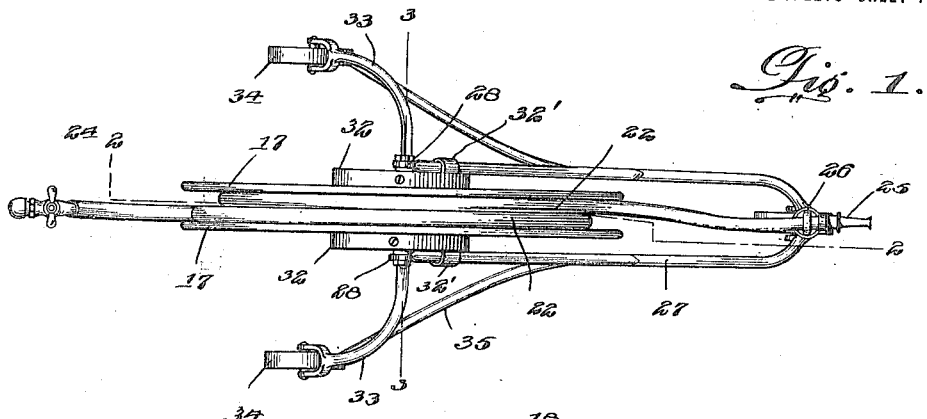
Figure 2:
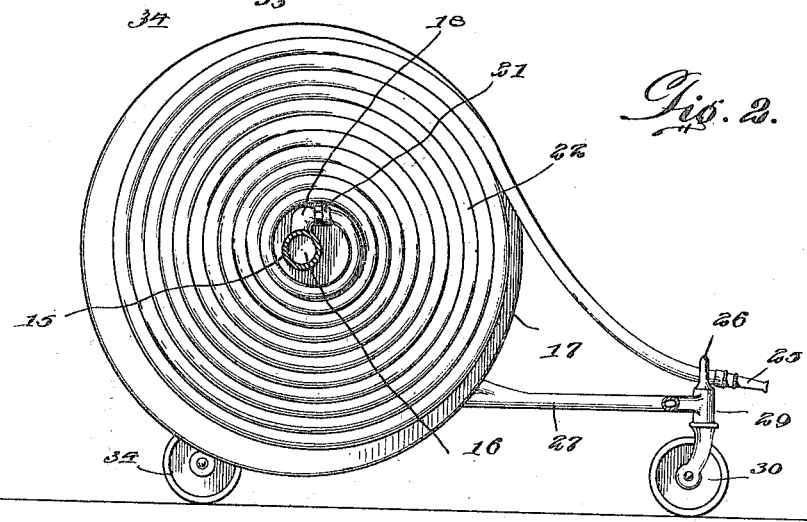
Figure 3:
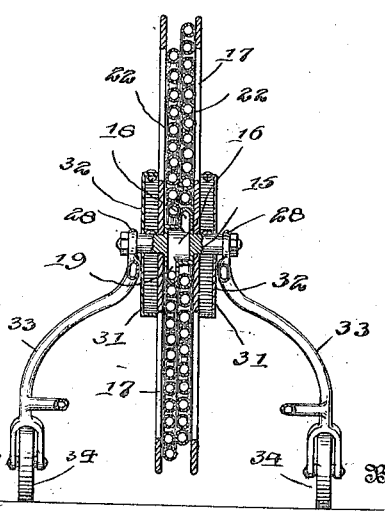
Figure 4:
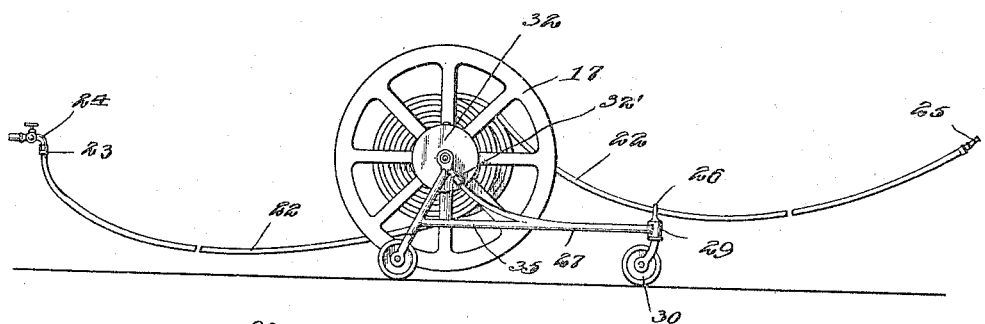
Figure 5:
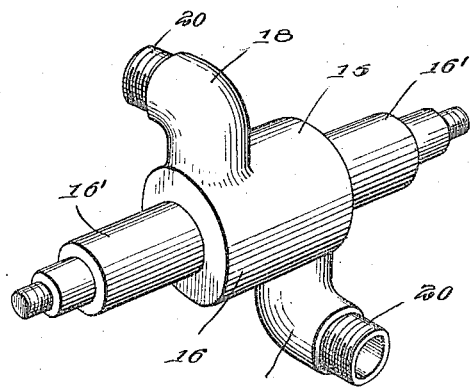
Figure 6:
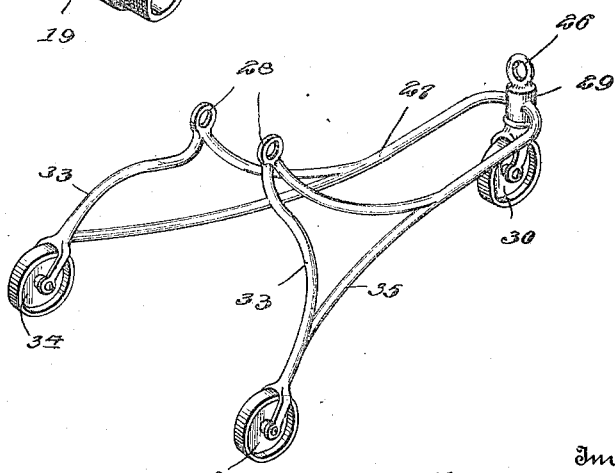

In the drawings,—Figure 1 is a top plan view of a device constructed in accordance with the invention. Fig. 2 is a longitudinal sectional view taken on the line 2—2 in Fig. 1. Fig. 3 is a transverse sectional view taken on the line 3—3 in Fig. 1. Fig. 4 is a view in side elevation showing the hose partly unwound for use. Fig. 5 is a perspective detail view of the axial member of the device. Fig. 6 is a perspective view of the yoke constituting the cart or wheeled support with the reel detached.

Corresponding parts in the several figures are denoted by like characters of reference.

The axle 15 of the improved device is cored intermediate the ends thereof to form a tubular chamber 16. The ends of the axle are left solid to form spindles 16' on which disks 17 are mounted which form the heads of the hose reel. The tubular cored portion of the axle is provided with outlets 18, 19 which may extend in opposite directions at diametrically opposite sides of the axle, as shown, or which may be otherwise suitably arranged, and having threaded portions 20 for engagement with the correspondingly threaded couplings 21 of the hose lengths 22. The free end of one hose length has a coupling 23 adapted to be connected with a hydrant 24; the free end of the other hose length is provided with a sprinkler or nozzle 25. The hose length having the nozzle 25 is guided through a loop or eye 26 formed on a yoke 27 the limbs of which have terminal eyes 28 affording bearings for the axle with which the yoke is thus pivotally connected. This yoke, which constitutes a part of the cart frame, is provided at its outer end with a shank 29 carrying a ground wheel or caster 30 which serves to assist in guiding the device and also to support a portion of the hose free from contact with the ground. The hose lengths 21 and 22 will, by rotation of the axle, be wound about the axis thereof, as will be readily understood. To produce such winding the springs 31 are provided, each spring having one end connected with the axle about which it is wound spirally, the other end of the spring being connected with a spring barrel or housing, 32, which surrounds the spring, said housings being connected with the cart frame by clips, 32', to prevent rotation thereof. The springs are coiled about the axle in such fashion that they will be tensioned by the uncoiling of the hose. Conversely, when uncoiling strain upon the hose is released, the tension of the springs will be utilized to so rotate the axle as to cause the hose to become coiled thereon.

It is preferred and intended to make the disks or heads 17 of large diameter so that each hose length may be coiled in a single spiral coil, the disk being spaced apart a distance but slightly in excess of the sum of the diameters of the hose lengths. In this manner kinking and twisting of the hose will be readily avoided.

It is obvious that by placing the disks 17 closely together as described, a narrow structure is formed which in the absence of preventive means will be easily upset. I, therefore, prefer to complete the cart structure by providing each limb of the yoke 27 with an arm 33 carrying a ground wheel 34 which, being suitably spaced from the proximate ground wheel, will support the device against upsetting. Braces 35 are provided to reinforce the arms 33.

In the operation of this device, the coupling 23 of the hose length 21 is connected with the hydrant 24, and the operator then grasps the nozzle connected with the hose length 22, the pulling strain on which will cause the cart or reel to travel over the ground, the hose being meanwhile uncoiled from the axle, and the springs 31 being simultaneously placed under tension. To recoil the hose after use the reel or cart is guided in the direction of the hydrant, the axle being rotated by the action of the springs, thus coiling the hose, as will be readily understood.

The improved device is simple, inexpensive in construction and thoroughly useful for the purpose for which it is provided.

Having thus described the invention, what is claimed as new, is:—

The combination with a wheel supported frame, of an axle member provided with terminal spindles whereby it may be supported for rotation upon the frame, said axle having a relatively large intermediate hollow portion defining shoulders, said enlarged portion being provided adjacent its ends and at diametrically opposite points with outlet nozzles, which latter are curved in opposite directions with their curvatures lying in planes at right angles to the axis of said axle, hose lengths coupled with said outlets to be wound about the axle with the convolutions of one hose disposed in juxtaposition and in contacting engagement with the convolutions of the other hose, disks mounted upon the axle and engaging shoulders at the opposite sides of the enlarged portion whereby said disks are spaced a distance apart slightly exceeding the combined diameters of the respective hose lengths, casings mounted upon the axle exteriorly of said disks, and a coil spring arranged within each casing, said spring being wound about the axle having one end secured thereto and its opposite end secured to said casing for the purpose described.

In testimony whereof I affix my signature in presence of two witnesses.

JOHN G. HOLMES.

Witnesses:
 FRANK BRANDON,
 HOWARD W. SIMS.

Copies of this patent may be obtained for five cents each, by addressing the "Commissioner of Patents, Washington, D. C."